(12) United States Patent
Koch

(10) Patent No.: US 11,141,664 B1
(45) Date of Patent: Oct. 12, 2021

(54) SYSTEMS AND METHODS FOR A SELLER-INITIATED PEER-TO-PEER EXCHANGE OF A NON-FUNGIBLE DIGITAL ASSET

(71) Applicant: Mythical, Inc., Sherman Oaks, CA (US)

(72) Inventor: Rudy Koch, Sammamish, CA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

(21) Appl. No.: 17/185,758

(22) Filed: Feb. 25, 2021

(51) Int. Cl.
| | | |
|---|---|---|
| A63F 13/00 | (2014.01) | |
| A63F 13/73 | (2014.01) | |
| A63F 13/69 | (2014.01) | |
| A63F 13/79 | (2014.01) | |
| H04L 9/32 | (2006.01) | |

(52) U.S. Cl.
CPC ............ *A63F 13/73* (2014.09); *A63F 13/69* (2014.09); *A63F 13/79* (2014.09); *H04L 9/3236* (2013.01); *A63F 2300/408* (2013.01); *A63F 2300/575* (2013.01); *H04L 2209/38* (2013.01)

(58) Field of Classification Search
None
See application file for complete search history.

(56) References Cited

U.S. PATENT DOCUMENTS

| | | |
|---|---|---|
| 8,272,961 B2 | 9/2012 | Busey |
| 9,440,151 B2 | 9/2016 | Van Luchene |
| 10,518,178 B1 * | 12/2019 | Cunningham ........ A63F 13/352 |
| 10,850,202 B1 * | 12/2020 | Koch ................... A63F 13/87 |
| 10,861,095 B1 * | 12/2020 | Koch ................... A63F 13/69 |
| 10,984,400 B1 | 4/2021 | Koch |
| 2001/0018366 A1 | 8/2001 | Shimomura |
| 2003/0109299 A1 | 6/2003 | Reizei |
| 2004/0147308 A1 | 7/2004 | Walker |
| 2006/0017229 A1 | 1/2006 | Hayakawa |
| 2006/0258463 A1 | 11/2006 | Cugno |
| 2007/0191103 A1 | 8/2007 | Van Luchene |
| 2008/0033734 A1 | 2/2008 | Carry |
| 2008/0070689 A1 | 3/2008 | Van Luchene |
| 2008/0139318 A1 | 6/2008 | Van Luchene |
| 2008/0167122 A1 | 7/2008 | Maeda |
| 2008/0227512 A1 | 9/2008 | Lang |
| 2012/0290977 A1 | 11/2012 | Devecka |
| 2013/0143670 A1 | 6/2013 | Junkin |
| 2013/0288788 A1 | 10/2013 | Lim |
| 2014/0045586 A1 | 2/2014 | Allen |

(Continued)

OTHER PUBLICATIONS

GameFaqs, "How do you bet pink slips?" https://gamefaqs.gamespot.com/ps2/938452-juiced-2-hot-import-nights/answers/190010-how-do-you-bet-pink-slips. Created 2010. (Year: 2020) 1 page.

(Continued)

*Primary Examiner* — Masud Ahmed
(74) *Attorney, Agent, or Firm* — Esplin & Associates, PC

(57) ABSTRACT

Systems and methods for using shared user inventory information to initiate peer-to-peer exchanges of digital assets that are usable within an online gaming platform are disclosed. Exemplary implementations may: receive an offer request for the transfer of ownership of a first digital asset from a first user to a second user; if the offer according to the offer request is accepted, transfer the ownership of the first digital asset as requested.

18 Claims, 5 Drawing Sheets

(56) References Cited

U.S. PATENT DOCUMENTS

| | | |
|---|---|---|
| 2014/0206452 A1 | 7/2014 | Bambino |
| 2015/0001799 A1 | 1/2015 | Cullen |
| 2015/0163311 A1 | 6/2015 | Heath |
| 2015/0371499 A1 | 12/2015 | Sansregret |
| 2018/0304159 A1 | 10/2018 | Campos |
| 2019/0180329 A1 | 6/2019 | Chetlur |
| 2019/0236594 A1 | 8/2019 | Ehrlich-Quinn |
| 2019/0282906 A1* | 9/2019 | Yong ................. G06Q 20/3827 |
| 2019/0299105 A1* | 10/2019 | Knight ................ G07F 17/3244 |
| 2019/0311341 A1* | 10/2019 | Rice ....................... G06Q 20/12 |
| 2020/0202668 A1* | 6/2020 | Cotta ..................... A63F 13/792 |
| 2020/0294133 A1* | 9/2020 | Cella ................. G06F 16/2379 |
| 2020/0311721 A1 | 10/2020 | Ow |
| 2020/0357246 A1 | 11/2020 | Nelson |
| 2021/0027281 A1* | 1/2021 | Kilroe ................ G06Q 20/3676 |
| 2021/0042830 A1* | 2/2021 | Burke ................. G06Q 20/341 |

OTHER PUBLICATIONS

GauthierDickey & Ritzdorf, in "Secure Peer-to Peer Trading for Multiplayer Games," IEEE (Year: 2012).

* cited by examiner

User interface 400 inventory 41

| Items: | Item information: | Visible? |
|---|---|---|
| virtual item 1 | item information 1 | ☐ |
| virtual item 2 | item information 2 | ☐ |
| virtual item 3 | item information 3 | ☐ |
| virtual item 4 | item information 4 | ☐ |
| virtual item 5 | item information 5 | ☐ | action button 42

*Fig. 4*

SYSTEMS AND METHODS FOR A SELLER-INITIATED PEER-TO-PEER EXCHANGE OF A NON-FUNGIBLE DIGITAL ASSET

FIELD OF THE DISCLOSURE

The present disclosure relates to systems and methods for seller-initiated peer-to-peer exchanges of digital assets that are usable within an online gaming platform.

BACKGROUND

Online gaming platforms are known. Users of online gaming platforms exchanging digital in-game assets with other users through a centralized exchange server (such as the online gaming platform itself) is known. Blockchains are known to function as decentralized ledgers, e.g., to record information.

SUMMARY

One aspect of the present disclosure relates to a system configured for using shared user inventory information to initiate peer-to-peer exchanges of digital assets that are usable within an online gaming platform. The digital assets may be not fungible. The system may comprise a decentralized ledger server, an external payment application server, and/or other components. The decentralized ledger server may be configured to implement a blockchain. The decentralized ledger server may include one or more processors configured by machine-readable instructions. The decentralized ledger server may be configured to record, on the blockchain, rights pertaining to digital assets. The recorded rights may reflect ownership of a first digital asset by the first user. The first digital asset may be not fungible and may either (i) be usable within the online gaming platform to perform an individual in-game action in an instance of the game, or (ii) may represent a three-dimensional in-game user-controllable character that can interact with other virtual items within the online gaming platform, or (iii) may be both (i) and (ii). The decentralized ledger server may be configured to receive instructions to modify the recorded rights. The external payment application server may include one or more processors configured by machine-readable instructions. The external payment application server may be configured to receive, on behalf of a first user, an offer request that represents an offer to transfer the ownership of the first digital asset from the first user to the second user. The external payment application server may be configured to transfer, to a second client computing platform associated with the second user, the offer request. The external payment application server may be configured to receive, on behalf of the second user, an acceptance of the offer. The external payment application server may be configured to generate a first set of instructions for the decentralized ledger server to accomplish the transfer as requested in the transfer request. The external payment application server may be configured to transfer the first set of instructions to the decentralized ledger server. The decentralized ledger server may be configured to receive the first set of instructions. The decentralized ledger server may be configured to transfer the ownership of the first digital asset from the first user to the second user in accordance with the received first set of instructions, such that the recorded rights on the blockchain no longer reflect the ownership of the first digital asset by the first user.

Another aspect of the present disclosure relates to a method for using shared user inventory information to initiate peer-to-peer exchanges of digital assets that are usable within an online gaming platform. The rights may pertain to the digital assets are recorded on a blockchain implemented by a decentralized ledger server. The rights may reflect ownership. The one or more digital assets may include a first digital asset. The first digital asset may be not fungible, and either is usable within the online gaming platform to perform an individual in-game action in the instance of the game, or represents a three-dimensional in-game user-controllable character that can interact with other virtual items within the online gaming platform, or both. The method may comprise receiving, on behalf of the first user, an offer request that represents an offer to transfer the ownership of the first digital asset from the first user to the second user. The method may comprise transferring, to a second client computing platform associated with the second user, the offer request. The method may comprise receiving, on behalf of the second user, an acceptance of the offer to transfer the ownership of the first digital asset from the first user to the second user. The method may comprise generating a first set of instructions for the decentralized ledger server to accomplish the transfer as requested in the transfer request. The method may comprise transferring the first set of instructions to the decentralized ledger server. The method may comprise receiving the first set of instructions. The method may comprise transferring the ownership of the first digital asset from the first user to the second user in accordance with the received first set of instructions, such that the rights as recorded on the blockchain no longer reflect the ownership of the first digital asset by the first user.

As used herein, any association (or relation, or reflection, or indication, or correspondency) involving servers, processors, client computing platforms, assets, requests, exchanges, offers, acceptances, transactions, in-game actions, rights, benefits, ownership, users, metrics, metric values, scores, sets of instructions, operations, determinations, distributions, transfers, presentations, notifications, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not

BRIEF DESCRIPTION OF THE DRAWINGS

FIG. 4 illustrates a user interface, as may be presented to the users of a system as described, in accordance with one or more implementations.

DETAILED DESCRIPTION

Figure 1:
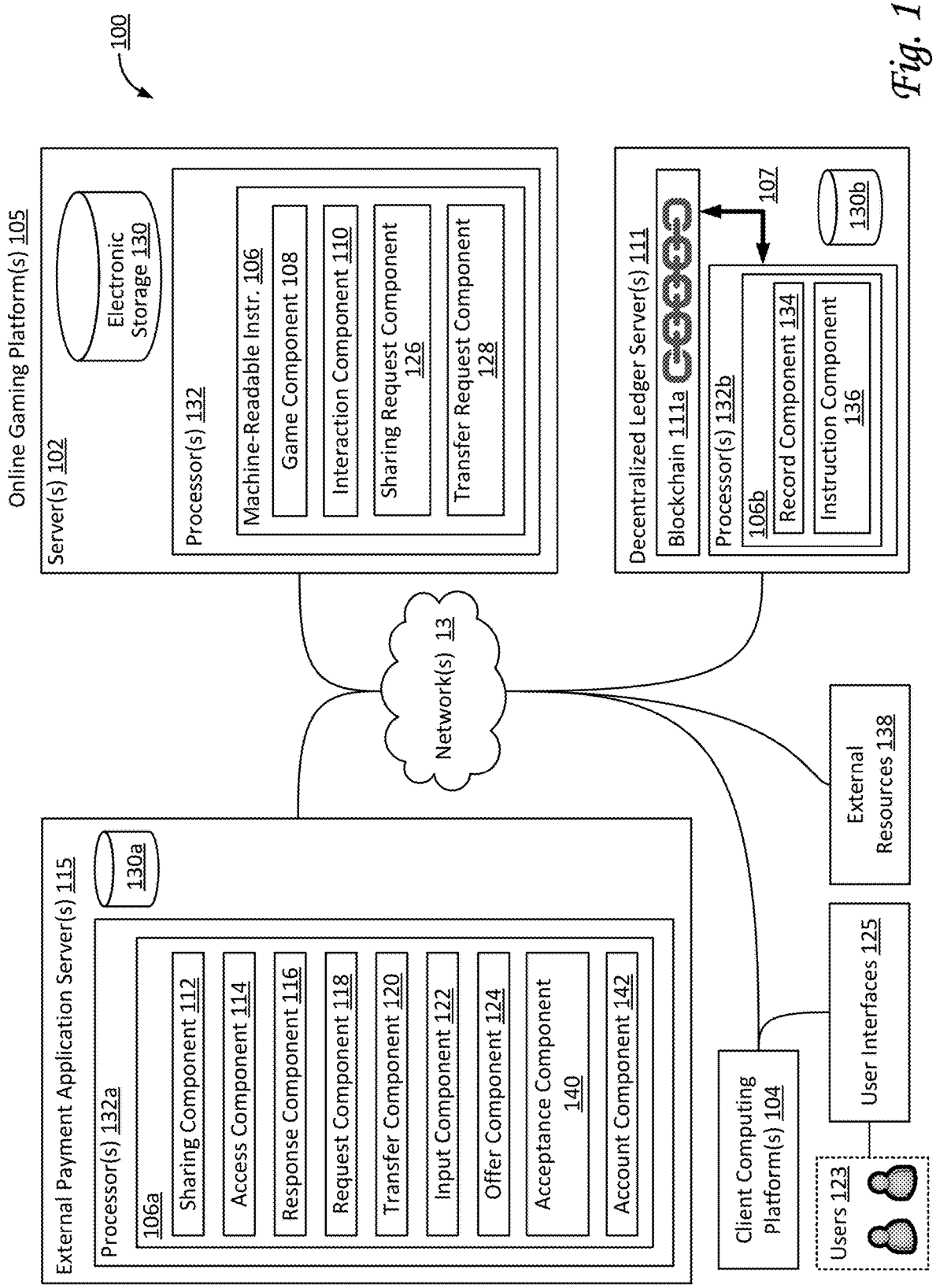
FIG. 1 illustrates a system configured for using shared user inventory information to initiate peer-to-peer exchanges of digital assets, in accordance with one or more implementations.

FIG. 1 illustrates a system 100 configured for using shared user inventory information to initiate (decentralized) peer-to-peer exchanges of digital assets, in accordance with one or more implementations. In some implementations, system 100 may be configured to control the sharing of user inventory information to initiate peer-to-peer exchanges of digital assets, including but not limited to digital assets that are not fungible. In some implementations, digital assets may be virtual items that are usable within one or more online gaming platforms 105, e.g., to perform an individual in-game action in an instance of a game. For example, some digital assets may represent a user-controllable three-dimensional in-game character that can interact with other virtual items within online gaming platform 105. In some implementations, online gaming platform 105 may be configured to host one or more games.

By way of non-limiting example, digital assets may represent virtual items. In some implementations, virtual items may include one or more of weapons, toys, characters, abilities, skills, tools, pets, clothing, vehicles, game levels, missions, assignments, chapters, tasks, mini-games, restricted areas within a virtual space, restricted modes of gameplay, access rights within an online game, and/or other virtual items. In some implementations, virtual items may refer to any item or object within gaming platform 105 that a user may use, own, sell, trade, destroy, and/or otherwise effectuate a change of ownership of.

As used herein, a digital asset is fungible if it is functionally and/or physically indistinguishable from another digital asset. For example, a payment token such as a Bitcoin may be a fungible digital asset. A digital asset may be non-fungible if it is unique, or one-of-a-kind. For example, a specific individual Crypt® Kitty™ may be a non-fungible digital asset. A digital asset may be semi-fungible if there is a set of a limited number of similar but distinguishable digital assets. For example, a limited-edition Blank® ™ or another in-game character may be a semi-fungible digital asset. For example, one of a limited number of 2-dimensional or 3-dimensional in-game virtual items may be a semi-fungible digital asset. For example, a digital ticket to a show, concert, exhibition, and/or other event may be a semi-fungible digital asset. For example, a piece of art or jewelry (e.g., as a virtual item or as representing a physical item) may be a semi-fungible digital asset. As used herein, both non-fungible and semi-fungible digital assets are considered as "not fungible" digital assets. In some implementations, semi-fungible digital assets may share the same or similar data as other digital assets, but have at least a unique identifier, and/or other distinguishable asset-specific information.

In some implementations, digital assets may be usable within one or more games. Instances of the games may be executed within one or more online gaming platforms 105. As used herein, online gaming platform 105 may refer to either an individual game (e.g., an interactive online game), a type of gaming console, an ecosystem of a game or gaming console, and/or any combination thereof. Online gaming platform 105 may be operated, hosted, and/or owned by one or more stakeholders of online gaming platform 105. For example, in some implementations, a platform operator (and/or another stakeholder) may sell digital in-game assets (e.g., characters, weapons, resources, etc.) to users 123 of online gaming platform 105. This may be referred to as a primary market for digital in-game assets. However, such a sale is not a peer-to-peer exchange. As used herein, peer-to-peer exchanges refer to individual players auctioning, selling, purchasing, trading, bartering, and/or otherwise exchanging digital assets (directly) with other individual players. In other words, individual players may own individual virtual items, and exchange these items with other individual players by virtue of the systems and methods described in this disclosure. This may be referred to as a secondary market for digital in-game assets. As used herein, a peer-to-peer exchange may be referred to as decentralized if no centralized authority (such as, e.g., a platform operator, an online store, etc.) is required to complete the exchange between two individual players.

Due to an exchange, ownership of a digital asset transitions from an original owner to a new owner (even if, in some implementations, there may be one or more intermediary and/or temporary owners during the process of performing the exchange). In some implementations, a particular exchange of a particular digital asset may be reversible if at least one party to the particular exchange unilaterally opts to reverse and/or undo the particular exchange such that the particular digital asset is returned to the original owner. In some implementations, either the original owner of the particular digital asset or the new owner of the particular digital asset may unilaterally opt for a reversal of the particular exchange. In some implementations, only the new owner may unilaterally opt for a reversal of the particular exchange. In some implementations, reversibility of a particular exchange may be limited in one or more ways. For example, reversibility may be time-limited to a predetermined number of days from a predefined moment and/or action within the particular exchange. In some implementations, the predefined moment and/or action within the particular exchange may be the moment the new owner commits to the particular exchange (where commitment may be defined by the absence of reversibility or by an assumption that the particular exchange will not be reversed). In some implementations, the predefined moment and/or action within the particular exchange may be the moment the new owner can use or actually uses the particular digital asset in any way. In some implementations, the predefined moment and/or action within the particular exchange may be the moment the original owner authorizes and/or commits to the particular exchange.

In some implementations, system 100 may include one or more external payment application servers 115, one or more online gaming platforms 105, one or more decentralized ledger servers 111, one or more client computing platforms 104, one or more user interfaces 125, one or more servers 102, electronic storage 130, one or more external resources 138, and/or other components. Users 123 (also referred to as players) may include one or more of a first user, a second user, a third user, a fourth user, and/or other users.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 123 may access system 100 via user interfaces 125 and/or client computing platform(s) 104.

In some implementations, components of system 100 may be configured to communicate with one or more of online gaming platform(s) 105, decentralized ledger server(s) 111, external payment application server(s) 115, client computing platform(s) 104, users 123, and/or other components. Users 123 may include players who play and/or otherwise interact on online gaming platform 105. In some implementations, online gaming platform 105 may include an online store or exchange that facilitates a primary market in digital assets.

Online gaming platforms 105 may include one or more of electronic storage 130, server(s) 102, processor(s) 132, machine-readable instructions 106, and/or other components. Server(s) 102 may be configured by machine-readable instructions 106. Machine-readable instructions 106 may include one or more instruction components. The instruction components may include computer program components. The instruction components may include one or more of a game component 108, an interaction component 110, a sharing component 112, an access component 114, a response component 116, a request component 118, a transfer component 120, an input component 122, an offer component 124, a sharing request component 126, a transfer request component 128, a record component 134, an instruction component 136, an acceptance component 140, an account component 142, and/or other components. The depiction in FIG. 1 of certain components being arranged, organized, and/or otherwise included in other components is merely exemplary, and not intended to be limiting.

In some implementations, external payment application server 115 may include one or more of electronic storage 130a, server(s) 102 (not depicted in FIG. 1), processor(s) 132a, machine-readable instructions 106a, and/or other components. External payment application server 115 may be external to both online gaming platform 105 and decentralized ledger server 111. External payment application server 115 may be configured to support exchanges involving fiat currency. In some implementations, payment applications may be linked to bank accounts, checking accounts, financial applications, and/or other financial services. In some implementations, external payment application server 115 may be configured to support exchanges involving combinations of fiat currency and virtual currency (including but not limited to one or more cryptocurrencies). External payment application server 115 may be configured to support user accounts for different users. For example, a first external user account may be associated with a first user, a second external user account may be associated with a second user, and so forth. These external user accounts may be separate, different, and/or independent of the user accounts in online gaming platform 105, even if associated with the same users.

Electronic storage 130a may be similar to electronic storage 130 as described elsewhere in this disclosure, though included in external payment application server 115. Processor(s) 132a may be similar to processor(s) 132 as described elsewhere in this disclosure, though included in external payment application server 115. Machine-readable instructions 106a may be similar to machine-readable instructions 106 as described elsewhere in this disclosure, though included in external payment application server 115. In some implementations, machine-readable instructions 106a may include one or more instruction components, such as sharing component 112, access component 114, response component 116, request component 118, transfer component 120, input component 122, offer component 124, acceptance component 140, account component 142, and/or other components.

In some implementations, decentralized ledger server(s) 111 may include one or more of a blockchain 111a, electronic storage 130b, server(s) 102 (not depicted in FIG. 1), processor(s) 132b, machine-readable instructions 106b, and/or other components. Electronic storage 130b may be similar to electronic storage 130 as described elsewhere in this disclosure, though included in decentralized ledger server(s) 111. Processor(s) 132b may be similar to processor(s) 132 as described elsewhere in this disclosure, though included in decentralized ledger server(s) 111. Machine-readable instructions 106b may be similar to machine-readable instructions 106 as described elsewhere in this disclosure, though included in decentralized ledger server(s) 111. In some implementations, machine-readable instructions 106b may include one or more instruction components, such as record component 134, instruction component 136, and/or other components.

Game component 108 may be configured to execute an instance of a game (e.g., an online game within online gaming platform 105) to facilitate presentation of the online game to users 123. In some implementations, game component 108 may be configured to implement in-game actions in the instance of the game, e.g., in response to action requests for the in-game actions by users 123. Users 123 may interact with online gaming platform 105. In some implementations, game component 108 may be arranged, organized, and/or otherwise included in online gaming platform 105. As used herein, the term "game" may refer to one or more games within gaming platform 105. The game may be provided via a virtual space, and may include a plurality of resource types and/or maps. An instance of the virtual space may be executed by one or more computer components to determine views of the virtual space. In some implementations, presentations of the game may be based on determined views. In some implementations, views may be communicated (e.g., by streaming, via object/position data, and/or other information) from server(s) 102 and/or other sources to client computing platforms 104 for presentation to users 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by a user.

The instance of the game may include a simulated space that is accessible by users 123 by clients (e.g., client computing platforms 104) that present the views of the virtual space to a user. The simulated space may have a topography, express ongoing real-time interaction by one or more users 123, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the game, users 123 may control characters, objects, simulated physical phenomena, and/or other elements within the virtual space to interact with the virtual space and/or each other. The user characters may include avatars. As used herein, the term "user character" may refer to an object or group of objects present in the virtual space, that correspond(s) to an individual user. A particular user character may be controlled by the particular user with which it is associated. Such user characters may be referred to as user-controlled characters. User-controlled element(s) may move through and interact with the virtual space (e.g., non-user characters in the virtual space, other objects in the virtual space, etc.). In some implementations, user-controlled characters may be capable of locomotion and/or movement within the topography of the simulated space that is included in the instance of a game. User-controlled elements controlled by and/or associated with a given user may be created and/or customized by the given user. Individual users 123 may have an "inventory" of virtual goods and currency (e.g., resources of the plurality of resource types) that the individual user can use (e.g., by manipulation of a user character and/or other user-controlled elements) and/or other items, to perform in-game actions within the virtual space. In some implementations, user inventories may be managed using blockchain 111*a*. For example, ownership of individual virtual items included in an individual user inventory may be recorded on blockchain 111*a*. In some implementations, individual user inventories may correspond to individual smart contracts stored on blockchain 111*a*.

In some implementations, game component 108 may be configured to manage user accounts on online gaming platform 105. For example, the user accounts may be associated with users 123. A first user may be associated with a first user account on online gaming platform 105, a second user may be associated with a second user account on online gaming platform 105, and so forth. In some implementations, managing user accounts may include managing access to user-specific information (e.g., through passwords and/or other mechanisms for authentications, authorization, and/or identity verification). In some implementations, the user-specific information may include user-specific settings and/or preferences pertaining to online gaming platform 105.

Interaction component 110 may be configured to facilitate interaction between users 123 within online gaming platform 105, and, in particular, within instances of the online games that are executed by game component 108. For example, interaction component 110 may facilitate interaction by a particular user with other users within an instance of a particular online game. For example, the interaction may include user-controlled in-game actions by a particular digital asset that are controlled by the particular user. In some implementations, the interaction may occur subsequent to temporarily transferring ownership of the particular digital asset from an original owner (e.g., to the particular user). Alternatively, and/or simultaneously, the interaction may occur prior to a determination whether to reverse a particular reversible exchange involving the particular digital asset. In some implementations, one or more particular types of interaction may be facilitated by interaction component 110. For example, interaction may be limited to certain types of in-game actions. In some implementations, interaction may be limited to a certain time or period, including but not limited to a waiting period as used and described elsewhere in this disclosure regarding time-limited reversibility of particular exchanges. In some implementations, interaction component 110 may be arranged, organized, and/or otherwise included in online gaming platform 105.

In some implementations, interaction component 110 may facilitate interaction by a particular user with other users within online gaming platform 105, through a particular digital asset that is being controlled by the particular user during a particular period, even though the particular user is not (yet) the non-temporary owner of the particular digital asset. For example, the particular period may start when the particular user commits to the exchange involving the particular digital asset, or when the particular user provides the benefit in exchange for the particular digital asset, and/or at another predefined moment during the exchange process. For example, the particular period may end at the moment a determination has been made regarding a reversal of the exchange involving the particular digital asset. In some implementations, one or more types of ownership rights are temporarily transferred to the particular user during the particular period. For example, one of the types of ownership rights may give the particular user the right to use the particular digital asset in certain limited ways. For example, usage may be limited to one or more types of in-game actions. For example, the allowed one or more types of in-game actions may exclude in-game actions that inflict damage to (or even destroy) the particular digital asset. In some implementations, upon a reversal of the exchange involving the particular digital asset, the temporarily transferred (types of) ownership rights may be modified and/or removed such that the particular user is no longer allowed and/or able to user the particular digital asset in the same way as compared to the particular period. In other words, in some implementations, the particular interaction as facilitated during the particular period may be disabled upon the reversal of the exchange.

Offer component 124 may be configured to receive offers and/or offer requests, e.g., on behalf of a particular user. By way of non-limiting example, offer requests may include offer requests as received from (or on behalf of) a particular user (e.g., through a particular client computing platform 104 associated with the particular user). By way of non-limiting example, an offer request received from a first user may represent an offer to transfer the ownership of a particular digital asset from the first user to a second user. In some implementations, offer requests may be transferred and received by external payment application server 115 (e.g., from a first external user account to a second external user account). In some implementations, a particular user's ability to transfer and/or receive offers and/or offer requests may be limited in time. For example, a period for a particular user to accept an offer (e.g., by effectuating a transfer of an acceptance) may (automatically) expire after, e.g., 10 minutes, 20 minutes, 30 minutes, 1 hour, 2 hours, 3 hours, 4 hours, 12 hours, 24 hours, and/or another number of hours (e.g., as determined by the first user, as measured from the moment the information based on the obtained asset information is transferred to the particular user, and/or as determined based on another predetermined moment in the operation of system 100). In some implementations, ownership of the particular digital asset offered for a particular transfer may be (temporarily) assigned to a holding account. For example, use of a temporary holding account may prevent the same digital asset from being exchanged twice between different users, or being offered for exchange twice at the same time (or in overlapping periods).

Response component 116 may be configured to transfer information, e.g., in response to requests. In some implementations, response component 116 may be configured to transfer requests and/or information pertaining to requests, including but not limited to offer requests. By way of non-limiting example, requests may include offer requests as received by offer component 124. By way of non-limiting example, requests may include sharing requests as received by sharing component 112. In some implementations, transferred information may include information obtained by access component 114. In some implementations, transferred information may include a reference and/or link to information obtained by access component 114. In some implementations, transferred information may be transferred to a particular user's client computing platform 104 (e.g., for sharing with other users and/or other client computing platforms 104). In some implementations, transferred information may be transferred to online gaming platform 105. In some implementations, transferred information may be transferred to external payment application server 115. In some implementations, transferred information may be transferred to decentralized ledger server 111 and/or blockchain 111a.

Acceptance component 140 may be configured to receive acceptances and/or information indicating acceptances from users 123. For example, acceptance component 140 may receive an acceptance from a particular user of a particular offer. For example, acceptance component 140 may receive the acceptance from a particular client computing platform 104 that is associated with the particular user. For example, the acceptance may pertain to the particular offer to transfer the ownership of a particular digital asset from a first user to the particular user.

Sharing component 112 may be configured to receive requests for information, including but not limited to (particular types of) sharing requests for sharing information regarding particular digital assets and/or particular user-specific inventories. For example, a particular sharing request may request sharing of information regarding one or more digital assets in a particular user inventory of a particular user. In some implementations, a sharing request may pertain to an entire user inventory. In some implementations, a user may select to opt-in one or more digital assets from the user's inventory with regard to sharing requests. In some implementations, a user may select to opt-out one or more digital assets from the user's inventory with regard to sharing requests. In some implementations, sharing component 112 may receive a request from a user's client computing platform 104. In some implementations, sharing component 112 may receive a request on behalf of a user from online gaming platform 105. In some implementations, sharing component 112 may receive a request on behalf of a user from external payment application server 115. In some implementations, actions performed by sharing component 112 and/or offer component 124 may be initiated based on physical proximity (e.g., using near-field communications (NFC) or other proximity-based communication techniques) between multiple client computing platforms 104 (e.g., associated with a first user and a second user).

Access component 114 may be configured to access decentralized ledger server 111 and/or blockchain 111a to obtain information. By way of non-limiting example, the obtained information may include asset information regarding digital assets. In some implementations, the digital assets may be recorded on blockchain 111a. In some implementations, rights pertaining to the digital assets may be recorded on blockchain 111a. In some implementations, recorded rights may reflect ownership of digital assets. For example, the digital assets may include a first digital asset, a second digital asset, and so forth. In some implementations, access component 114 may access decentralized ledger server 111 and/or blockchain 111a to analyze recorded information (e.g., rights, transactions, and so forth) to determine a particular user's inventory, a particular digital asset's owner(ship), and/or other information stored in blockchain 111a.

In some implementations, transfer component 120 may be configured to transfer information to client computing platforms 104, users 123, and/or other components of system 100. For example, transfer component 120 may transfer offer requests (e.g., as received by offer component 124) to particular users and/or user accounts, e.g., of online gaming platform 105. In some implementations, transfer component 120 may be configured to generate and/or transfer sets of instructions. The sets of instructions may be for decentralized ledger server 111, e.g., to accomplish a transaction on blockchain 111a. In some implementations, transfer component 120 may generate a set of one or more instructions to accomplish a transfer (e.g., of ownership of a particular digital asset) as requested in a particular transfer request (e.g., as received by request component 118). In some implementations, response component 116 may be configured to transfer sets of information (as generated by transfer component 120) to decentralized ledger server 111 and/or blockchain 111a. In some implementations, transfer component 120 may be configured to generate instructions that include one or more function calls of an Application Programming Interface (API). In some implementations, the API may be configured to provide interactive communication between blockchain 111a and one or more external payment application servers 115. In some implementations, the API may be configured to provide interactive communication between decentralized ledger server 111 and one or more external payment application servers 115. In some implementations, API function calls may be implemented as function calls to smart contracts stored on blockchain 111a.

Account component 142 may be configured to manage (external) user accounts on external payment application server 115. For example, the user accounts may be associated with users 123. A first user may be associated with a first external user account on external payment application server 115, a second user may be associated with a second external user account on external payment application server 115, and so forth. In some implementations, managing user accounts may include managing access to user-specific information (e.g., through passwords and/or other mechanisms for authentications, authorization, and/or identity verification). In some implementations, the user-specific information may include user-specific settings and/or preferences pertaining to external payment application server 115.

Request component 118 may be configured to receive requests for transfers of ownership. For example, request component 118 may receive a particular request for a transfer of ownership of a particular digital asset. Transfer requests may be to transfer the ownership from a first user to a second user. In some implementations, a particular transfer request may be to move a particular digital asset from a first blockchain to a second blockchain (e.g., a blockchain hosted by external payment application server 115 and/or stakeholders of external payment application server 115). In some implementations, a transfer request may be received from a source external to both online gaming platform 105 and decentralized ledger server 111. In some implementations, a transfer request may be received from a particular user. For example, request component 118 may receive a transfer request from a client computing platform 104 associated with the particular user. For example, request component 118 may receive a transfer request from external payment application server 115. In some implementations, other external sources may be envisioned. In some implementations, the users may reach an agreement regarding a particular exchange through a source external to both online gaming platform 105 and decentralized ledger server 111, such as, for example, through external payment application server 115. For example, one user may make an offer (which may be represented by an offer request), and the other user may accept the offer (which may in some implementations be implied by the other user providing and/or transferring a transfer request). In some implementations, this communication (from offer to acceptance) may take place via external payment application server 115 (e.g., between external user accounts that are managed within external payment application server 115, e.g., by account component 142).

Instruction component 136 may be configured to receive (sets of) instructions to add, modify, and/or remove recorded rights in blockchain 111a. For example, instruction component 136 may receive one or more sets of instructions from response component 116, transfer component 120, online gaming platform 105, and/or other components of system 100. Instruction component 136 may provide received sets of instructions to record component 134 for execution. In some implementations, execution of individual ones of the instructions received to modify recorded rights may include invoking one or more function calls of an Application Programming Interface (API) 107. API 107 may be configured to provide interactive communication between blockchain 111a and one or more external payment application servers 115. For example, in some implementations, API function calls may be implemented as function calls to smart contracts stored on blockchain 111a. In some implementations, API 107 may be configured to provide interactive communication between decentralized ledger server 111 and one or more external payment application servers 115. For example, through API 107, a first external payment application server 115 may transfer a first digital asset from a first user to a second user, and a second external payment application server 115 may transfer a second digital asset from a third user to a fourth user, and so forth.

In some implementations, instruction component 136 may be arranged, organized, and/or otherwise included in decentralized ledger server 111 and/or blockchain 111a.

Record component 134 may be configured to record rights pertaining to digital assets on blockchain 111a. In some implementations, record component 134 may record rights on a decentralized ledger implemented by decentralized ledger server 111. For example, the decentralized ledger may be blockchain 111a. The rights may include ownership rights, distribution rights, and/or other rights. For example, particular recorded rights may reflect ownership of a particular digital asset by a particular user. For example, the particular digital asset may be not fungible, and may represent a three-dimensional in-game user-controllable character that can interact with other virtual items within online gaming platform 105. Recorded rights may be asset-specific. For example, distribution rights for a particular digital asset may designate rights to certain distributions of benefits upon an exchange involving the particular digital asset. For example, the asset-specific distribution rights for a particular digital asset may include one or more of (i) a right owned by a different user to a part of the benefits upon an exchange, (ii) a right owned by one or more stakeholders of online gaming platform 105 to a part of the benefits upon an exchange, (iii) a right owned by one or more stakeholders of external payment application server 115 upon an exchange, and/or other distribution rights. These parts of a benefit may have different sizes, percentages, and/or conditions.

In some implementations, record component 134 may be configured to record rights in blockchain 111a. In some implementations, record component 134 may add, modify, and/or remove recorded rights. For example, in accordance with received instructions from instruction component 136, record component 134 may transfer ownership of a particular digital asset from a first owner to a second owner (e.g., from an original owner to a new owner) such that the recorded rights on blockchain 111a no longer reflect the ownership of the particular digital asset by the first user. In some implementations, in accordance with received instructions, record component 134 may transfer ownership of a particular digital asset temporarily, e.g., from a first owner to a temporary second owner. In some case, a temporary owner may be a holding account that is merely used until ownership is transferred to either the original owner or a new owner. As used herein, the term "temporary" (and derivatives thereof) refers to a transfer or to ownership that is either known to be changed and/or modified within a predetermined period, or expected to be changed and/or modified within a predetermined period. Conversely, a non-temporary transfer from a first owner to a second owner (due to a particular exchange) can conceivably be changed and/or reverted (back from the second owner to the first owner) due to a separate and new exchange that is independent of the first particular exchange. In some implementations, in accordance with received instructions, record component 134 may transfer ownership of a particular digital asset non-temporarily from a first owner to a second owner, e.g., when a particular exchange is not reversible or no longer reversible. In some implementations, record component 134 may be arranged, organized, and/or otherwise included in blockchain 111a.

In some implementations, record component 134 may be configured to obtain asset-specific rights (e.g., ownership rights, distribution rights, and/or other rights) for particular digital assets. In some implementations, record component 134 may be configured to access blockchain 111a to obtain the asset-specific rights (that are recorded on blockchain 111a, e.g., in one or more smart contracts).

Input component 122 may be configured to receive user input from users. In some implementations, user input may be received through user interfaces 125. In some implementations, user input may provide entry and/or selection of one or more digital assets to be included by sharing component 112 (or offer component 124, and/or by other components of system 100). In some implementations, user input may provide entry and/or selection of one or more digital assets to be excluded by sharing component 112 (or offer component 124, and/or by other components of system 100).

Sharing request component 126 may be configured to generate and/or transfer requests, including but not limited to sharing requests that are transferred to and received by sharing component 112 and offer requests that are transferred to and received by offer component 124. In some implementations, sharing request component 126 may be included in online gaming platform 105. In some implementations, operations by sharing request component 126 may be initiated by (or through) a user account that is managed by online gaming platform 105. In some implementations, operations by sharing request component 126 may be initiated by (or through) an external user account. For example, a first user may transfer an sharing request (e.g., based on the username of a particular user, or some identifier that identifies the particular user, or on physical proximity of the particular user's client computing platform 104, and so forth), and, in response to such a sharing request, share (obtained) asset information for at least part of the first user's inventory of digital assets. In some implementations, the sharing of asset information may be limited in time. For example, a period of this particular sharing of information may (automatically) expire after, e.g., 10 minutes, 20 minutes, 30 minutes, 1 hour, 2 hours, 3 hours, 4 hours, 12 hours, 24 hours, and/or another number of hours.

Transfer request component 128 may be configured to generate and/or transfer (transfer) requests, including but not limited to transfer requests that are transferred to and received by request component 118 and/or other components. In some implementations, transfer request component 128 may be included in online gaming platform 105. In some implementations, operations by transfer request component 128 may be initiated by (or through) a user account that is managed by online gaming platform 105. In some implementations, operations by transfer request component 128 may be initiated by (or through) an external user account. For example, a first user may transfer a transfer request pertaining to a particular transfer and a particular user (e.g., including and/or based on the username of the particular user, or some identifier that identifies the particular user, or on physical proximity of the particular user's client computing platform 104, and so forth), and, in response to receipt of such a transfer request, system 100 may initiate and/or accomplish the transfer of one or more digital assets from the first user's inventory of digital assets.

In some implementations, transferring a transfer request may occur in response and/or subsequent to receiving an offer request (say, from a particular user) that represents an offer (e.g., to transfer the ownership of a particular digital asset from the first user to the particular user). In some implementations, transferring the transfer request may constitute, imply, and/or represent an acceptance by the first user of the offer. In some implementations, offers and/or offer requests may be accompanied by the particular user committing, relinquishing, and/or otherwise allowing system 100 to secure the items, amounts of currencies, and/or other objects that are to be exchanged in this transfer.

Figure 3:
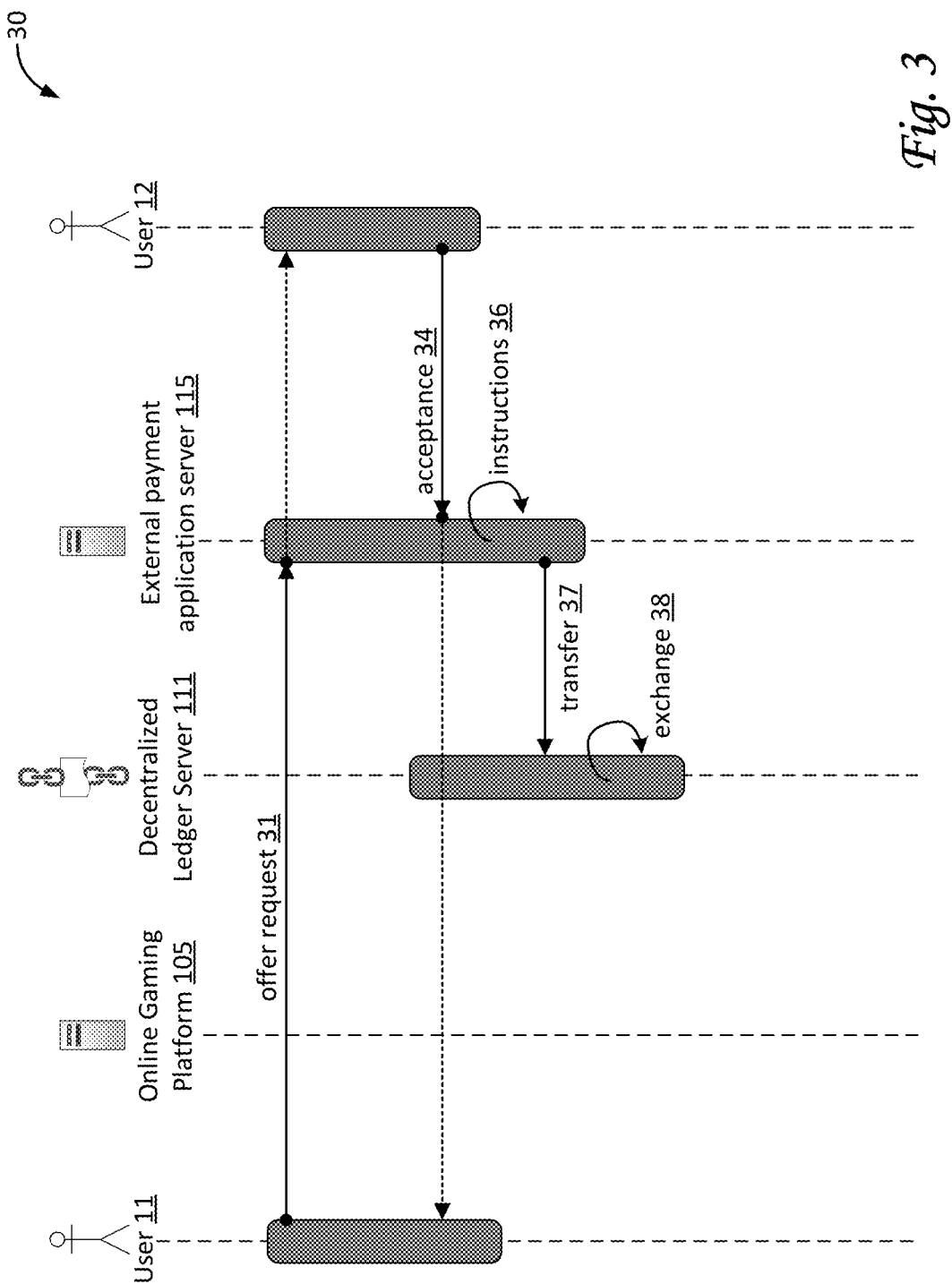
FIG. 3 illustrates an exemplary timing diagram of actions as may occur in a system as described, in accordance with one or more implementations.

By way of non-limiting example, FIG. 3 illustrates an exemplary timing diagram 30 of actions as may occur in a system similar to or the same as system 100. A first action in timing diagram 30 represents an offer request 31 from a user 11 to external payment application server 115 (which may transfer the offer request to user 12). Subsequent to offer request 31, user 12 may transfer an acceptance 34 to external payment application server 115 and/or user 11. Subsequently, external payment application server 115 may generate a set of instructions 36, and transfer the set of instructions to decentralized ledger server 111 and/or blockchain 111*a*, as indicated by transfer 37. Subsequently, decentralized ledger server 111 and/or blockchain 111*a* may execute the set of instructions to accomplish and/or perform the exchange of ownership from user 11 to user 12, as indicated by exchange 38. Actions in accordance with this disclosure may include additional and/or different actions and/or steps then depicted in FIG. 3, which is merely intended to be exemplary.

By way of non-limiting example, FIG. 4 depicts a user interface 400, as may be presented to individual users through particular user interfaces 125 to facilitate the exchange of digital assets (and/or information about digital assets) between users. Available digital assets for exchange (for a particular user) may be presented as an inventory 41, including a list of virtual items (from 1 to 5), associated item information (from 1 to 5), and graphical user interface elements (here, action buttons) that enable an individual user to toggle visibility, such as, for example an action button 42 that would, upon activation by the individual user, make virtual item 1 visible to other users (e.g., through a sharing request as described elsewhere in this disclosure). In some implementations, the associated virtual item information (here, item information 1 to 5) may include item-specific information. For example, store interface 400 may be presented to user 11 (in FIG. 3), such that activation of action button 42 enables particular information to be shared with user 12.

In some implementations, blockchain 111*a* may be maintained by a distributed computing platform (not shown in FIG. 1). In some implementations, the distributed computing platform may be implemented by a set of client computing platforms and/or servers. The distributed computing platform may support a virtual machine (not shown in FIG. 1). The distributed computing platform and/or the virtual machine may form a runtime environment for smart contracts and/or other executable code. In some implementations, the distributed computing platform may include electronic storage configured to store part or all of blockchain 111*a*. The smart contracts may be stored on blockchain 111*a*. In some implementations, the distributed computing platform may be the EOSIO platform. In some implementations, the distributed computing platform may be Ethereum. In some implementations, the distributed computing platform may be similar to Ethereum. In some implementations, the virtual machine may be a decentralized virtual machine.

Blockchain 111*a* may implement a decentralized ledger that records rights pertaining to digital assets. For example, a blockchain is a type of ledger, as well as a type of decentralized database that records rights pertaining to digital assets. A given (digital) asset may be owned by a particular user. An asset may include anything of material value or usefulness that is owned by or on behalf of one or more users. In some implementations, a virtual item (that may be used within gaming platform 105 and/or may be useful within gaming platform 105) may be represented by a digital asset that is recorded on one or more blockchain 111*a*. In some implementations, a right pertaining to an object (e.g., a distribution right) may be an asset, the object being a physical or a virtual item. Multiple rights may form a set of rights or a bundle of rights that may be transferred and/or otherwise acted on and/or operated on together. For example, rights may include one or more of a right to use, a right to sell, a right to destroy, a right to certain types of distributions, and/or other rights. For example, in some implementations, rights pertaining to a virtual item (e.g., ownership) may be recorded on blockchain 111a.

In some implementations, tokens may be a type of asset. In some implementations, tokens may include one or more of security tokens, utility tokens, payment tokens, initial coin offering (ICO) tokens, virtual currency tokens, crypto tokens, ERC-20 tokens, EOS tokens, and/or other tokens. In some implementations, tokens not only represent value, but may have a specific use in a particular distributed computing platform, e.g., in the operation of blockchain 111a.

In some implementations, blockchain 111a may register transactions that modify ownership (and/or other rights) pertaining to digital assets. A smart contract may implement a (type of) digital asset. In some implementations, once a smart contract has been added to a blockchain, the smart contract may be referred to as published, posted, registered, and/or recorded. Elements of blockchain 111a may be grouped together in units that are referred to as blocks. For example, an individual block may include one or more assets and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more assets, one or more transactions, and/or other information. In some implementations, individual blocks in the structure of blocks may be linked together based on a hashing function that provides one-way encryption (see below). In some implementations, multiple transactions may be recorded in an individual block. In some implementations, addition of an individual block to the structure of blocks may require that at least a minimum number of nodes independently agree to append the individual block in accordance with a consensus mechanism.

In some implementations, blockchain 111a may be publicly accessible. In some implementations, blockchain 111a may be append-only. In some implementations, existing blocks of a distributed blockchain can substantially not be altered or deleted, unless multiple copies of the distributed blockchain are altered. This is unlikely to happen provided that multiple copies of the distributed blockchain are stored on different computing platforms, e.g., in different geographical locations. The distributed blockchain may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or assets may be digitally signed in a manner that proves integrity and/or prevents tampering, e.g., by providing authentication.

Figure 5A:
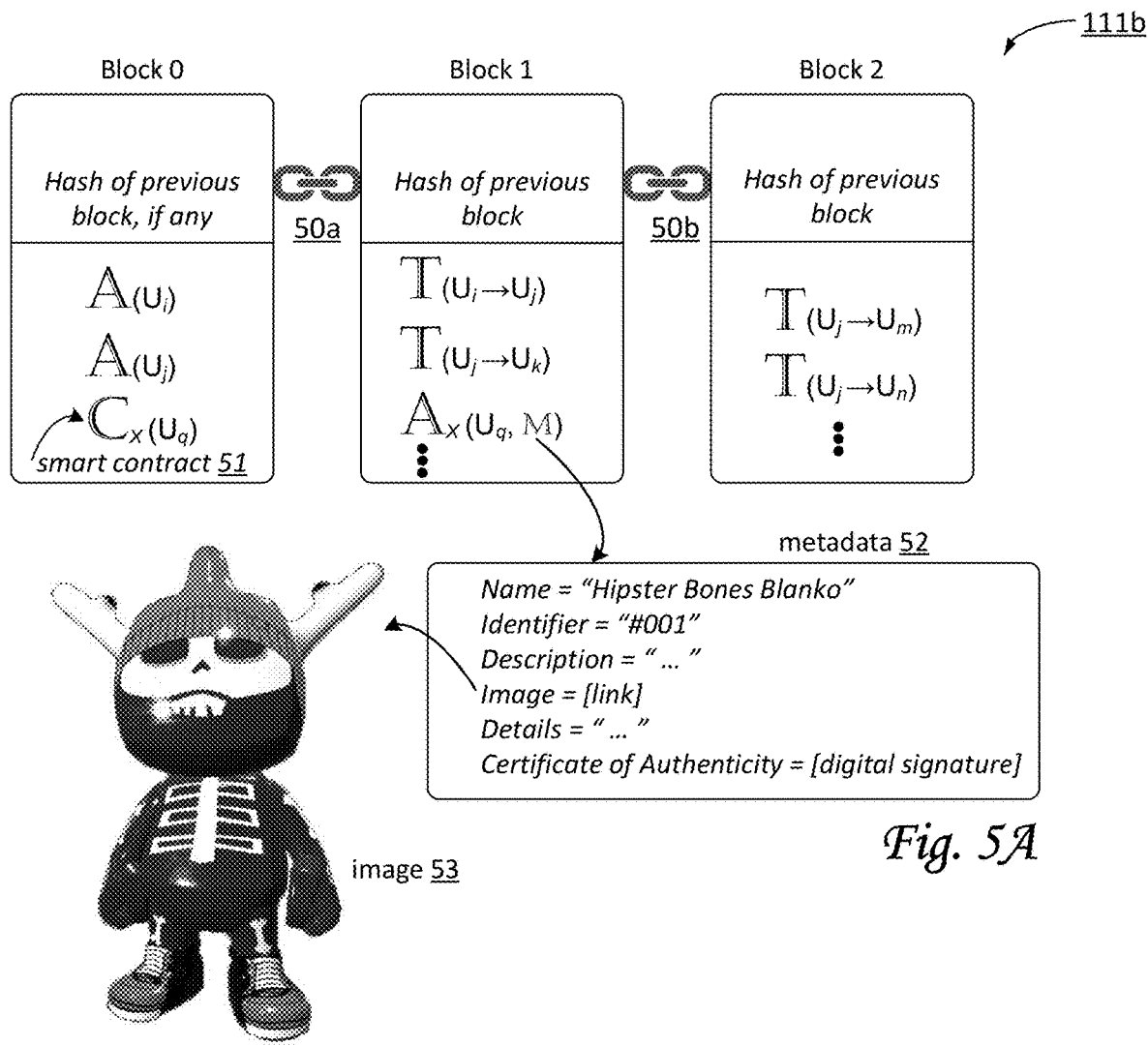
FIGS. 5A-5B illustrate exemplary blockchains as may be used by a system configured for using shared user inventory information to initiate peer-to-peer exchanges of digital assets, in accordance with one or more implementations.

By way of non-limiting example, FIG. 5A illustrates a blockchain 111b that implements a blockchain including a block 0, a block 1, and a block 2. For example, blockchain 111b may be similar to blockchain 111a (not depicted in FIG. 5A) as described elsewhere in this disclosure. As time progresses, more blocks may be added to blockchain 111b.

The blocks within blockchain 111b are ordered. As shown in block 0, three assets (indicated by a capital "A" or "C") are created and/or generated, and subsequently assigned to three users or players: a first asset is assigned to user i (Ui), a second asset is assigned to user j (Uj), and a third asset is a smart contract 51 (indicated by a capital "C") that is assigned to or owned by user q (Uq). Smart contract 51 may implement a limited number of digital assets of a given type "X". A function call to a function defined by smart contract 51 (e.g., to request a particular type of usage, creation, and/or issuance of a digital asset of type "X") may be depicted and/or implemented as a transaction (e.g., the function may be invoked in exchange for consideration). In some implementations, smart contract 51 may have been posted to blockchain 111b by (or on behalf of) an owner or creator (here, user q). As used in the context of blockchains, assignments may record ownership. These assets and smart contracts may be individually manifested, deployed, and/or instantiated through a record component similar to record component 134 (see FIG. 1). Block 1 is connected to block 0 (as indicated by a link 50a), for example by including an address of block 1 in block 0, or vice versa. Likewise, block 1 is connected to block 2, as indicated by a link 50b.

In block 1, one asset (labeled Ax) is assigned to user q (Uq), for example by associating an address of user q with asset Ax. Asset Ax may represent an individual digital asset of type "X", which may be not fungible. Asset Ax may be created and/or issued by invoking one or more function calls to smart contract 51. Asset Ax may have associated metadata 52 (indicated by a capital "M"), which may include and/or link to different types of information, including but not limited to one or more of a name, identifier, description, an image 53, (in-game) details, certificate of authenticity, and/or other information, as depicted. For example, the certificate of authenticity may be a digital signature. Additionally, block 1 includes two transactions (indicated by a capital "T"): a first transaction from user i to user j, and a second transaction from user j to user k. Block 2 includes a first transaction from user j to user m, and a second transaction from user j to user n. In some implementations, based on the contents of the blocks, any user of blockchain 111b may determine the current assets of blockchain 111b, and the balances of any user. In some implementations, the balance of a particular user may be verified prior to adding a transaction that reduces that particular user's balance. For example, an individual user may not be allowed to transfer assets the individual user does not own.

Figure 5B:
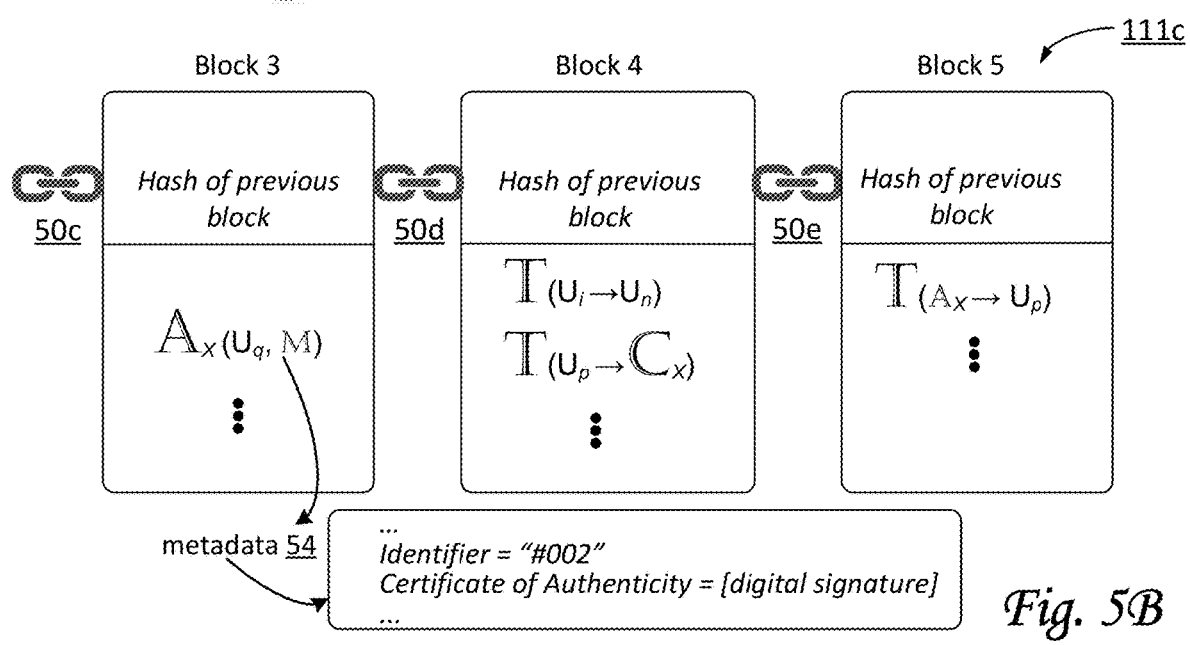

By way of non-limiting example, FIG. 5B illustrates a blockchain 111c that includes the same blocks as blockchain 111b of FIG. 5A, plus additional blocks (block 3, block 4, block 5) that have been appended to the blockchain. Block 3 may be connected to block 2 (as indicated by a link 50c), block 4 may be connected to block 3 (as indicated by a link 50d), and block 5 may be connected to block 4 (as indicated by a link 50e). In block 3, another asset (labeled Ax, having associated metadata 54) of type "X" is assigned to user q (Uq). At least the identifier (here, "#002") and the certificate of authenticity in metadata 54 will be different than the identifier and the certificate of authenticity in metadata 52 of FIG. 5A. Block 4 includes two transactions (indicated by a capital "T"): a first transaction from user i to user n. For example, the transaction may represent a purchase of a first virtual item by user n. Additionally, block 4 includes a second transaction from user p to the same smart contract as depicted in block 0. For example, the second transaction may represent an acceptance of an offer request by user p, accepting the offer to exchange a particular digital asset of the given type "X" for a particular benefit. The ownership of the particular digital asset may be subsequently recorded as and/or otherwise assigned to user p. Block 5 includes this transaction (indicated by a capital "T"), representing a non-temporary transfer of ownership of the particular digital asset of the given type "X" from old owner user q to new owner user p. For example, the transaction in block 5 may occur after user q receives the particular benefit from user p in exchange for ownership of the particular digital asset.

Referring to FIG. 1, user interfaces 125 may be configured to facilitate interaction between users 123 and system 100 and/or between users 123 and client computing platforms 104. For example, user interfaces 125 may provide an interface through which users 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100. In some implementations, user interface 125 may be a type of interface that facilitates the exchange of virtual items between users.

Referring to FIG. 1, in some implementations, server(s) 102, client computing platform(s) 104, and/or external resources 138 may be operatively linked via one or more electronic communication links. For example, such electronic communication links may be established, at least in part, via one or more networks 13, including but not limited to the Internet and/or other networks. It will be appreciated that this is not intended to be limiting, and that the scope of this disclosure includes implementations in which server(s) 102, client computing platform(s) 104, and/or external resources 138 may be operatively linked via some other communication media.

A given client computing platform 104 may include one or more processors configured to execute computer program components. The computer program components may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a smart watch, a gaming console, and/or other computing platforms.

External resources 138 may include sources of information outside of system 100, external entities participating with system 100, and/or other resources. For example, in some implementations, external resources 138 may include an online financial platform through which users may access financial information and/or perform financial transactions. In some implementations, some or all of the functionality attributed herein to external resources 138 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, 124, 126, 128, 134, 136, 140, and/or 142, and/or other components. Processor(s) 132 may be configured to execute components 108, 110, 112, 114, 116, 118, 120, 122, 124, 126, 128, 134, 136, 140, and/or 142, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, 126, 128, 134, 136, 140, and/or 142 are illustrated in FIG. 1 as being implemented within particular components, in implementations in which processor(s) 132 includes multiple processing units, one or more of components 108, 110, 112, 114, 116, 118, 120, 122, 124, 126, 128, 134, 136, 140, and/or 142 may be implemented remotely from the other components. The description of the functionality provided by the different components 108, 110, 112, 114, 116, 118, 120, 122, 124, 126, 128, 134, 136, 140, and/or 142 described below is for illustrative purposes, and is not intended to be limiting, as any of components 108, 110, 112, 114, 116, 118, 120, 122, 124, 126, 128, 134, 136, 140, and/or 142 may provide more or less functionality than is described. For example, one or more of components 108, 110, 112, 114, 116, 118, 120, 122, 124, 126, 128, 134, 136, 140, and/or 142 may be eliminated, and some or all of its functionality may be provided by other ones of components 108, 110, 112, 114, 116, 118, 120, 122, 124, 126, 128, 134, 136, 140, and/or 142. As another example, processor(s) 132 may be configured to execute one or more additional components that may perform some or all of the functionality attributed below to one of components 108, 110, 112, 114, 116, 118, 120, 122, 124, 126, 128, 134, 136, 140, and/or 142.

Figure 2:
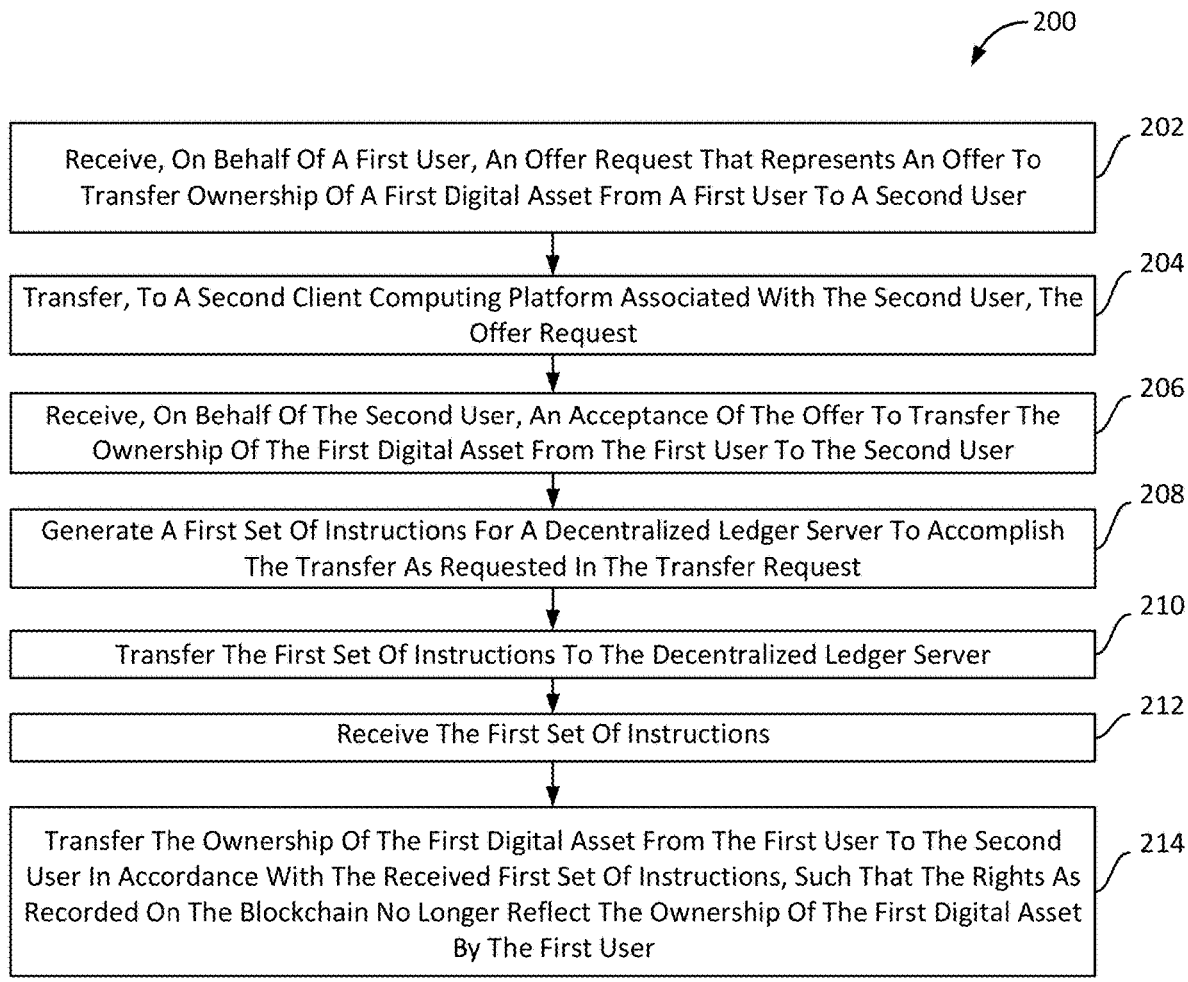
FIG. 2 illustrates a method for using shared user inventory information to initiate peer-to-peer exchanges of digital assets, in accordance with one or more implementations.

FIG. 2 illustrates a method 200 for using shared user inventory information to initiate peer-to-peer exchanges of digital assets, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an offer request is received, on behalf of a first user. The offer request represents an offer to transfer ownership of a first digital asset from the first user to the second user. In some embodiments, operation 202 is performed by an offer component the same as or similar to offer component 124 (shown in FIG. 1 and described herein).

At an operation 204, the offer request is transferred, to a second client computing platform associated with the second user. In some embodiments, operation 204 is performed by a transfer component 120 the same as or similar to transfer component 120 (shown in FIG. 1 and described herein).

At an operation 206, an acceptance is received, on behalf of the second user, to transfer the ownership of the first digital asset from the first user to the second user. In some embodiments, operation 206 is performed by an acceptance component the same as or similar to acceptance component 140 (shown in FIG. 1 and described herein).

At an operation 208, a first set of instructions is generated for the decentralized ledger server to accomplish the transfer as requested. In some embodiments, operation 208 is performed by a transfer component the same as or similar to transfer component 120 (shown in FIG. 1 and described herein).

At an operation 210, the first set of instructions is transferred to the decentralized ledger server. In some embodiments, operation 210 is performed by a transfer component the same as or similar to transfer component 120 (shown in FIG. 1 and described herein).

At an operation 212, the first set of instructions is received. In some embodiments, operation 212 is performed by an instruction component the same as or similar to instruction component 136 (shown in FIG. 1 and described herein).

At an operation 214, the ownership of the first digital asset is transferred from the first user to the second user in accordance with the received first set of instructions, such that the rights as recorded on the blockchain no longer reflect the ownership of the first digital asset by the first user. In some embodiments, operation 214 is performed by a record component the same as or similar to record component 134 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for seller-initiated peer-to-peer exchanges of digital assets that are usable within an online gaming platform, wherein the digital assets are not fungible, the system comprising:

a decentralized ledger server configured to implement a blockchain, wherein the decentralized ledger server includes one or more processors configured by machine-readable instructions to:
record, on the blockchain, rights pertaining to digital assets, wherein the recorded rights reflect ownership of a first digital asset by a first user, wherein the first digital asset is not fungible and either:
(i) is usable within the online gaming platform to perform an individual in-game action in an instance of the game, or
(ii) represents a three-dimensional in-game user-controllable character that can interact with other virtual items within the online gaming platform, or
(iii) both (i) and (ii); and
receive instructions to modify the recorded rights, wherein execution of individual ones of the received instructions includes invoking one or more function calls of an Application Programming Interface (API), wherein the API is configured to provide interactive communication between the blockchain and one or more external payment application servers, including a particular external payment application server;

the particular external payment application server, wherein the particular external payment application server includes one or more processors configured by machine-readable instructions to:
receive, on behalf of the first user, an offer request that represents an offer to transfer the ownership of a first digital asset from the first user to the second user;
transfer, to a second client computing platform associated with the second user, the offer request;
receive, on behalf of the second user, an acceptance of the offer to transfer the ownership of the first digital asset from the first user to the second user;
generate a first set of instructions for the decentralized ledger server to accomplish the transfer as offered in the offer request;

transfer the first set of instructions to the decentralized ledger server;
wherein the one or more processors included in the decentralized ledger server are further configured by machine-readable instructions to:
receive the first set of instructions;
in accordance with the received first set of instructions, transfer the ownership of the first digital asset from the first user to the second user, such that the recorded rights on the blockchain no longer reflect the ownership of the first digital asset by the first user.

2. The system of claim 1, wherein the one or more processors of the particular external payment application server are further configured to:
receive, on behalf of the first user, a sharing request for sharing information regarding a first user inventory with the second user, wherein the sharing request is received on behalf of the first user from the first client computing platform associated with the first user, wherein the first user inventory is associated with the first user, and wherein the first user inventory includes the first digital asset; and
access the blockchain to obtain asset information about one or more of the digital assets such that the recorded rights of the one or more digital assets reflect ownership by the first user, wherein the one or more digital assets include the first digital asset.

3. The system of claim 2, wherein the one or more processors of the particular external payment application server are further configured to:
transfer, to the second client computing platform associated with the second user, information based on the obtained asset information, in response to the sharing request.

4. The system of claim 3, wherein the one or more processors of the particular external payment application server are configured such that the sharing request is received on behalf of the first user through a first external user account associated with the first user, wherein the first external user account is managed by the particular external payment application server, and wherein the particular external payment application server is configured to support exchanges involving fiat currency.

5. The system of claim 4, wherein the one or more processors of the particular external payment application server are further configured to:
manage users accounts associated with the users, including the first external user account associated with the first user, wherein the first external user account is separate and different from a first user account on the online gaming platform, the first user account being associated with the first user.

6. The system of claim 2, wherein the one or more processors of the particular external payment application server are further configured to:
receive user input from the first user, wherein the user input provides entry and/or selection of one or more digital assets to be excluded from the transferred information in response to the sharing request.

7. The system of claim 3, wherein one or both of the sharing request and the offer request include an identifier that identifies the second user, wherein the identifier is obtained by the first user, and wherein obtainment of the identifier is based on physical proximity of the first client computing platform to the second client computing platform.

8. The system of claim 1, wherein the recorded rights on the blockchain reflect the ownership of the first digital asset by the second user.

9. The system of claim 1, wherein execution of the received first set of instructions effectuates recording the ownership of the first digital asset by the second user on a second blockchain that is different from the blockchain implemented by the decentralized ledger server.

10. A method for seller-initiated peer-to-peer exchanges of digital assets that are usable within an online gaming platform, wherein the digital assets are not fungible, wherein rights pertaining to the digital assets are recorded on a blockchain implemented by a decentralized ledger server, wherein the rights reflect ownership of the digital assets, the method comprising:
receiving, by an external payment application server, on behalf of a first user, an offer request that represents an offer to transfer ownership of a first digital asset from the first user to a second user;
transferring, to a second client computing platform associated with the second user, the offer request;
receiving, on behalf of the second user, an acceptance of the offer to transfer the ownership of the first digital asset from the first user to the second user;
generating, by the external payment application server, a first set of instructions for the decentralized ledger server to accomplish the transfer as offered in the offer request;
transferring the first set of instructions to the decentralized ledger server;
receiving the first set of instructions; and
transferring the ownership of the first digital asset from the first user to the second user in accordance with the received first set of instructions, such that the rights as recorded on the blockchain no longer reflect the ownership of the first digital asset by the first user, wherein execution of individual instructions in the first set of instructions includes invoking one or more function calls of an Application Programming Interface (API), wherein the API is configured to provide interactive communication between the blockchain and one or more external payment application servers, including the external payment application server.

11. The method of claim 10, further comprising:
receiving, on behalf of the first user, a sharing request for sharing information regarding a first user inventory with the second user, wherein the sharing request is received on behalf of the first user from a first client computing platform associated with the first user, wherein the first user inventory is associated with the first user, and wherein the first user inventory includes the first digital asset; and
accessing the blockchain to obtain asset information about one or more of the digital assets such that the recorded rights of the one or more digital assets reflect ownership by the first user, wherein the one or more digital assets include the first digital asset.

12. The method of claim 11, further comprising:
transferring, to the second client computing platform associated with the second user, information based on the obtained asset information, in response to the sharing request.

13. The method of claim 12, wherein the sharing request is received on behalf of the first user through a first external user account associated with the first user, wherein the first external user account is managed by the external payment application server, and wherein the external payment application server is supports exchanges involving fiat currency.

14. The method of claim 13, further comprising:
managing users accounts associated with the users, including the first external user account associated with the first user, wherein the first external user account is separate and different from a first user account on the online gaming platform, the first user account being associated with the first user.

15. The method of claim 11, further comprising:
receiving user input from the first user, wherein the user input provides entry and/or selection of one or more digital assets to be excluded from the transferred information in response to the sharing request.

16. The method of claim 12, wherein one or both of the sharing request and the offer request include an identifier that identifies the second user, wherein the identifier is obtained by the first user, and wherein obtainment of the identifier is based on physical proximity of the first client computing platform to the second client computing platform.

17. The method of claim 10, wherein the recorded rights on the blockchain reflect the ownership of the first digital asset by the second user.

18. The method of claim 10, wherein execution of the received first set of instructions effectuates recording the ownership of the first digital asset by the second user on a second blockchain that is different from the blockchain implemented by the decentralized ledger server.

* * * * *